US009536238B2

(12) United States Patent
Garrett et al.

(10) Patent No.: US 9,536,238 B2
(45) Date of Patent: Jan. 3, 2017

(54) HAND-HELD ELECTRONICS DEVICE FOR AGGREGATION OF AND MANAGEMENT OF PERSONAL ELECTRONIC DATA

(76) Inventors: Peter Garrett, Aptos, CA (US); Paul Regen, Felton, CA (US)

( * ) Notice: Subject to any disclaimer, the term of this patent is extended or adjusted under 35 U.S.C. 154(b) by 505 days.

(21) Appl. No.: 12/650,278

(22) Filed: Dec. 30, 2009

(65) Prior Publication Data

US 2010/0260388 A1    Oct. 14, 2010

Related U.S. Application Data

(60) Provisional application No. 61/142,100, filed on Dec. 31, 2008.

(51) Int. Cl.
*G06Q 20/32* (2012.01)
*G06Q 20/22* (2012.01)

(52) U.S. Cl.
CPC .............. *G06Q 20/32* (2013.01); *G06Q 20/22* (2013.01); *H04Q 2213/13095* (2013.01)

(58) Field of Classification Search
CPC ...... G06Q 20/341; G06Q 20/32; G06Q 20/22; G07F 7/1008; H04Q 2213/13095
See application file for complete search history.

(56) References Cited

U.S. PATENT DOCUMENTS

| | | | |
|---|---|---|---|
| 2004/0066273 A1* | 4/2004 | Cortina et al. | 340/5.1 |
| 2004/0087339 A1* | 5/2004 | Goldthwaite | G06Q 20/10 455/558 |
| 2005/0247797 A1* | 11/2005 | Ramachandran | 235/492 |
| 2005/0269402 A1* | 12/2005 | Spitzer et al. | 235/380 |
| 2006/0016884 A1* | 1/2006 | Block | G06K 19/08 235/381 |
| 2006/0261174 A1* | 11/2006 | Zellner et al. | 235/492 |
| 2007/0264976 A1* | 11/2007 | Lessing et al. | 455/414.1 |
| 2008/0119226 A1* | 5/2008 | Son | 455/556.2 |
| 2008/0126260 A1* | 5/2008 | Cox et al. | 705/67 |
| 2009/0176566 A1* | 7/2009 | Kelly | 463/29 |
| 2009/0240625 A1* | 9/2009 | Faith et al. | 705/65 |
| 2011/0047074 A1* | 2/2011 | Cai | 705/41 |

* cited by examiner

*Primary Examiner* — Sonji Johnson
(74) *Attorney, Agent, or Firm* — Lamon Patent Services; Cynthia S. Lamon

(57) ABSTRACT

A hand-held electronics device for aggregation of and management of personal electronic data useable for identification and, or transacting business includes a digital medium for storing data and software, a card reading/writing interface, a display screen, a biometric scanner, a user interface application stored on and executable from the digital medium and a docking bay for docking a readable and rewriteable internal card blank.

31 Claims, 16 Drawing Sheets

HAND-HELD ELECTRONICS DEVICE FOR AGGREGATION OF AND MANAGEMENT OF PERSONAL ELECTRONIC DATA

CROSS-REFERENCE TO RELATED APPLICATIONS

The present application claims priority to U.S. provisional patent application Ser. No. 61/142,100, filed on Dec. 31, 2008. The entire disclosure is included herein in its entirety at least by reference.

BACKGROUND OF THE INVENTION

1. Field of the Invention

The present invention is in the field of ecommerce and pertains particularly to methods and apparatus for transacting using data preloaded from one or more transaction cards.

2. Discussion of the State of the Art

Mobile phone technology is becoming increasingly more advanced with the advent of Smartphone technology. A Smartphone is a mobile phone offering advanced capabilities beyond a typical mobile phone, often with PC-like functionality. Some Smart phones are capable of running complete operating system software providing a standardized interface and platform for application developers. Other Smart phones simply come with advanced features like e-mail and Internet capabilities, and/or a full keyboard. The recent advancements in Smartphone technology have made it possible for the user to wirelessly interact with the consumer environment around them.

Credit card transacting is more and more prevalent with the advent of the Internet and ecommerce Websites. Likewise retail outlets now have wireless Intranet presence and smart transaction terminals. One problem with credit card transacting is the prospect of having cards lost or stolen. Another issue is knowing which cards to use under what circumstance. Having a card rejected by a sales clerk in front of other consumers may be embarrassing. A consumer must manually check balances, interest rates, and credit limits and remember those when using the associated cards. The inventors realized that if a smart phone could be developed that would read and write transaction card data and could enable account access and update from the same interface, transacting would be more reliable and less frustrating for users.

SUMMARY OF THE INVENTION

The problem stated above is that simplification of personal electronic transacting is desirable for a user having multiple debit, credit, and identification cards to manage, but many of the conventional means for simplifying transacting, such as provision of terminal-based card reading devices and user identity verification devices still require the use of more than one electronic card for more than one security verification situation and, or transaction type. The inventors therefore considered functional elements of an electronics transacting and identification system looking for elements that exhibit properties of interoperability that could potentially be harnessed to provide simplified transacting and identification verification but in a manner that would not create confusion or any work associated with personal card management.

Every economy is dependant on the credit system and on personal identification verification for security in transacting, one by-product of which is an abundance of consumers that must manage multiple separate credit, debit, identification, and various other types of electronic cards used for purchasing and the like. Most electronic transaction interfaces employ card readers to conduct the data gathering of personal data and key or touch screen interfaces for completing the identification verification process required to complete transactions and identification queries. Smart cards equipped with a variety of micro-electronics and wireless transponder capabilities are becoming common to the apparatus for electronic transacting.

The present inventor realized in an inventive moment that if, at the point of transacting or identification verification procedure, personal data and security data could be accessed electronically and in a secure manner without sorting through multiple separate cards, significant simplification in electronic transacting might result. The inventor therefore constructed a unique hand-held electronics device that allowed users to upload data from multiple cards into one storage system wherein the uploaded data is made selectively accessible to the user for initiating and completing electronic transactions at conventional transaction terminals. A significant simplification in card and account management results, with no impediment to transacting or identification verification created.

Accordingly, in one embodiment of the present invention, a hand-held electronics device is provided for aggregation of and management of personal electronic data useable for identification and, or transacting business comprising, a digital medium for storing data and software, a card reading/writing interface, a display screen, a biometric scanner, a user interface application stored on and executable from the digital medium, and a docking bay for docking a readable and rewritable internal card blank.

In one embodiment the electronics device is useable for network navigation and communication. In one embodiment the display screen is an organic light emitting diode (OLED) touch screen. In one embodiment the card reading and writing interface is a magnetic card reader-writer for reading and writing to magnetic media associated with a magnetic card. In one embodiment the electronics device further includes an image-scanning interface for scanning whole cards and reading magnetic card data.

In one embodiment the personal electronic data includes credit card data, debit card data, store-issued card data, and identification card data. In one embodiment the user interface displays on the touch screen interface. In this embodiment the interface includes selectable options for confirming identity including selecting and loading individual "personal data" sets for write, ejecting the internal card blank, and for navigating to account information hosted on a network, the account information associated with the individual personal data sets.

According to one embodiment of the invention a readable and rewriteable magnetic card blank is provided for use with a hand-held electronics device having a card reading and writing interface for aggregation of and management of personal electronic data comprising a readable and rewriteable magnetic media disposed on a credit card form factor. The personal data are read into the electronics device via the card reading interface and selectively or collectively written as individual data sets onto the magnetic media on the card blank via the card writing interface for use in electronic transacting or fulfillment of electronic identification queries.

In one embodiment the magnetic media is a magnetic stripe. In one embodiment card blank further includes a microprocessor chip and an onboard power source. In a variation of this embodiment the card blank further includes a radio frequency identification (RFID) chip and an on/off contact switch. In a variation of this embodiment the card blank further includes a biometric sensor and scanner chip and one or more organic light emitting diode (OLED) touch screens. In this embodiment the OLED touch screens include one on the rear face of the card for displaying a three digit security code, one on the rear face of the card for displaying a signature, and one on the front face of the card for displaying the front face of a credit, debit, or identification card having data stored on the magnetic media.

In a variation of the embodiment recited above the touch screen on the front of the card enables selection of an individual data set and card associated imagery for transactional use and display from a menu listing more than one data set and card associated imagery preloaded onto the card blank.

According to one aspect of the present invention, a method for collecting and redistributing one or more personal information data sets associated with electronic identification, credit, or debit cards for use in electronic transacting or fulfillment of electronic identification queries comprising the steps (a) entering or scanning security data into a hand-held electronics device having an internal data card blank via a user interface including a biometric scanner displayed on a touch screen display on the device, (b) upon acceptance of the security data in step (a), preloading one or more personal data sets associated with one or more credit, debit, or identification cards into the hand-held device via a card reading interface on the device, (c) using the user interface of step (a) selecting one or more of the personal data sets from a menu displayed on the touch screen display, (d) re-entering security data to confirm identity for writing data, and (e) writing the one or more personal data sets selected from the menu of step (c) onto the magnetic media of the card blank via a card writing interface on the device.

In one aspect of the invention, the security data includes a personal identification number (PIN). In one aspect in step (d) the security data re-entered includes a thumb or finger print scanned in to match a thumb or fingerprint image stored on the device. In one aspect of the method in step (c) each menu entry includes updated credit and balance information.

BRIEF DESCRIPTION OF THE DRAWING FIGURES

DETAILED DESCRIPTION

The inventors provide a hand-held electronics device for aggregation of and management of personal electronic data useable for identification and, or transacting business. The device may also function as a cellular telephone in one embodiment and may include a data read/write smart card that can be used to represent multiple transaction cards. The present invention is described in enabling detail using the following examples, which may represent more than one embodiment of the present invention.

Figure 1:
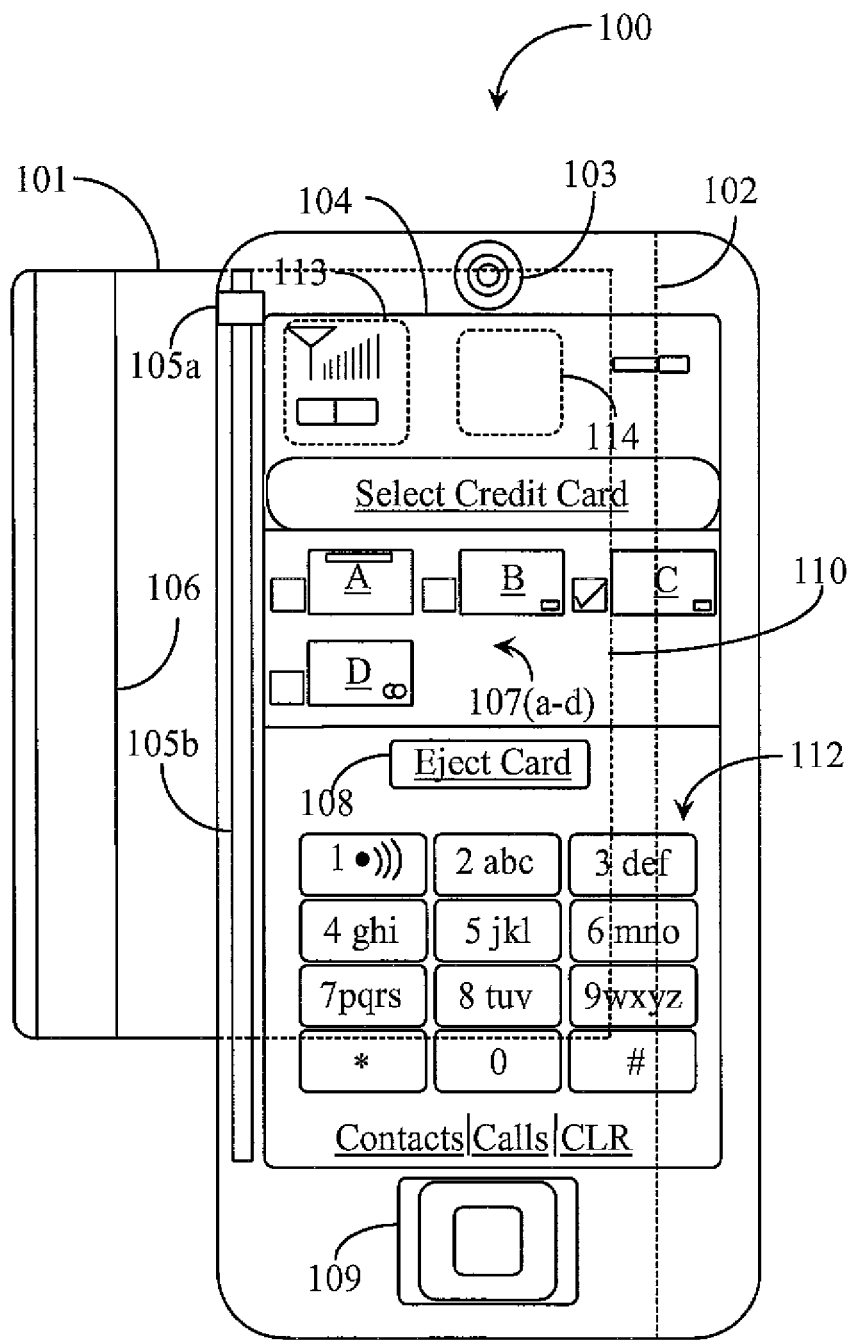
FIG. 1 is an elevation view of a digital wallet smart phone according to an embodiment of the present invention.

FIG. 1 is an elevation view of a digital wallet smart phone 100 according to an embodiment of the present invention. Smart phone 100 is adapted as a hand-held communications device that can be used to aggregate and manage personal data for identification verification purposes and for performing transactions using a digital wallet application loaded on a digital medium coupled to or otherwise accessible to the phone. Smart phone 100 is a 3rd generation (3G) or fourth generation (4G) wireless telephone that includes a number of physical features that enable the phone to read a transaction card such as transaction card 101. Transaction card 101 may be any one of a credit card, debit card, department store card, medical account card, or state identification card. Transaction card 101 has a magnetic stripe 106 deposited thereon that contains the digital card data.

Transaction card 101 fits into a card bay 110 in this example, and can be inserted into and ejected from card bay 110 (illustrated as a broken boundary). In one embodiment transaction card 101 is a read/write card blank that can be read from and written to by phone 100. Phone 100 has a card reader slot 102 provided thereto and adapted to enable the user to load personal card information into the device by reading card information from the magnetic stripes of such cards. This information is stored on the phone and can be written to a blank card such as card 101 using a magnetic stripe writer device represented herein by a guide track 105*b* and a slidable switch 105*a*.

Smart phone 101 includes many basic and standard features expected of such a device like a camera 103, a speaker system 109, and a keypad 112. A touch screen display 104 is provided on smart phone 100. Touch screen display 104 may be an organic light emitting diode (OLED) display, or some other interactive touch screen material. Force sense resistive technology or other touch screen technologies may be used to drive OLED screen 104. Phone 100 further includes a standard connection status display and a power use display (battery charge indicator).

In one embodiment smart phone 100 includes a smart chip for enabling biometrics security scanning and a radio frequency identification (RFID) chip for enabling wireless transactions over a network using a wireless communications technology such as Bluetooth™, or wireless fidelity (WiFi), or some other wireless data transmission protocol such as infrared, wireless universal serial bus (USB) and so on. Smartphone 100 may be adapted to support any one, some, or all of the mentioned wireless protocols.

Smart phone 100 has a software (SW) application resident and executable from a digital medium coupled to the device that enables the present invention along with added physical mechanisms such as a card reader/writer interface, for example. Screen 104 may display, for example, the number of digital cards that the user has loaded into the smart phone for use as a digital wallet. In this example, an interactive option "Select Credit Card" is presented to a user when the digital wallet portion of the device is accessed from a device menu. In this case credit card summary data 107 (*a-d*) is displayed for every card loaded onto the phone. A check box accompanies each listing and enables the user to select one or more cards by checking the box.

Each card icon in data displays 107 (*a-d*) represents a face view of the associated transaction card pre-loaded into the digital wallet. Likewise, each display entry is a clickable hyperlink to a more detailed view of the data associated with the account. A user would first authenticate with the smart phone and only then could the user access such sensitive data. In one embodiment a Visa card may be swiped for read at magnetic reader interface 102 where the stored data may later be presented in the list of entries 107 (*a-d*). A user may select which card he or she will use for a particular transaction. Before a user may access his or her digital wallet information, the user must validate or authenticate to the system. In this respect a user may be required to enter a username, a personal identification number (PIN), and scan a biometric such as a fingerprint or thumbprint. Other biometric interfaces may be used in place of a fingerprint scanner without departing from the spirit and scope of the present invention.

After set up and configuration steps, a user may pre-load individual transaction cards into the digital wallet application on the smart phone by swiping each card through magnetic stripe reader interface 102. The stored data sets may be presented for view as data sets 107 (*a-d*). Card Blank 101 may have any of the data sets selected from 107 (*a-d*) onto its magnetic stripe using magnetic writer 105 (*a,b*) with card 101 fully inserted into card bay 110. Card blank 101 may then be ejected for use as a standalone card by invoking a card eject icon 108. Car blank 101 is a read/write internal smart card used to transfer a pre-loaded data set associated with a transaction card, state identification card, medical card, or any other card having bearing card data. In one embodiment a user may manually load or type in transaction or identification card data sets into the system using any suitable input device including the touch screen interface.

Figure 2:
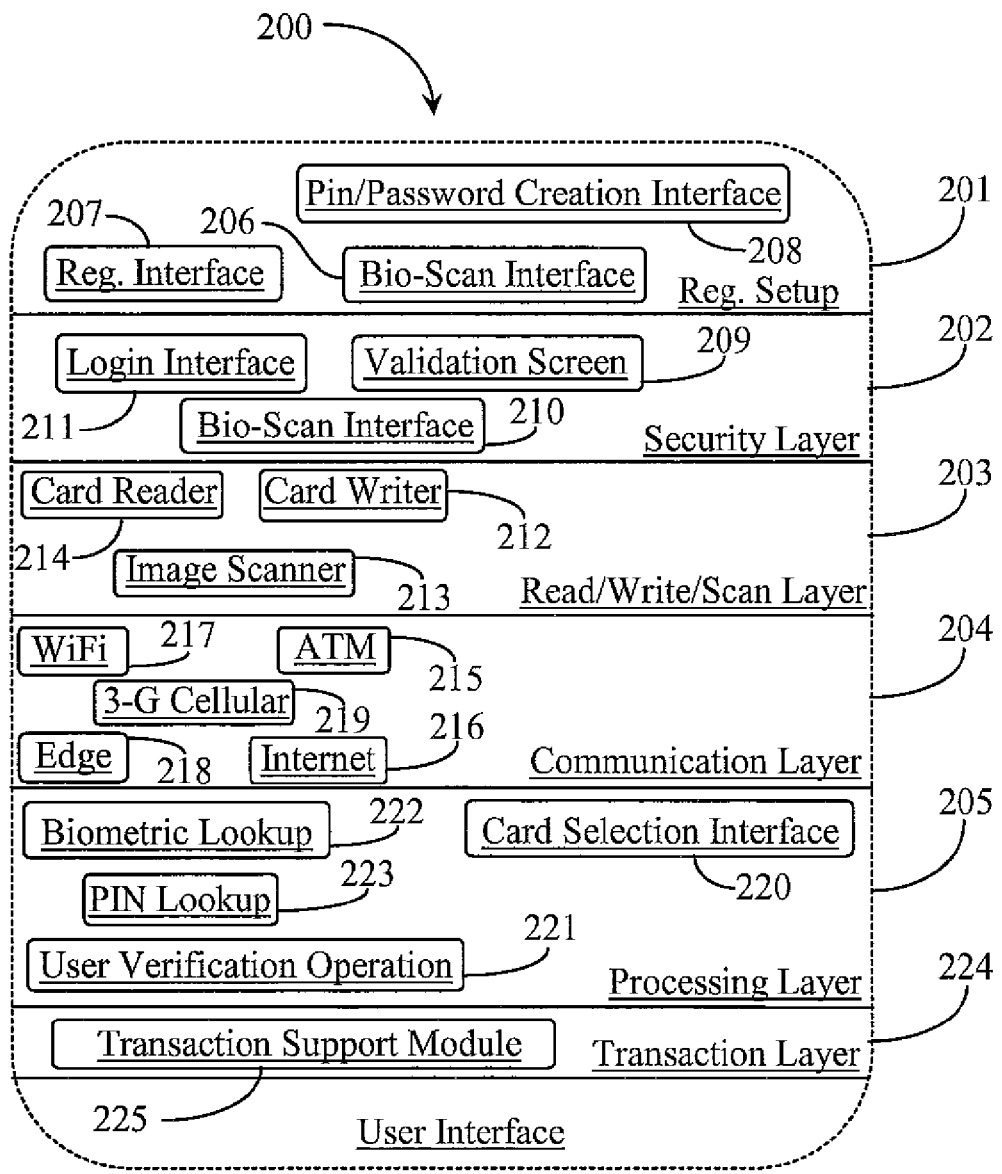
FIG. 2 is a block diagram illustrating components of a digital wallet software application according to an embodiment of the present invention.

FIG. 2 is a block diagram illustrating components of a digital wallet software application according to an embodiment of the present invention. Application 200 is a user interface application that includes several layers of functionality. Application 200 includes a registration and setup layer 201 that executes for a first time user of the digital wallet application on a smart phone. Layer 201 includes a personal identification number (PIN) and or password creation interface 208. Interface 208 is invoked during the registration process where the user creates his or her own PIN and password combination for verification purposes. Without the PIN and password the user may not access digital wallet functions or features.

Layer 201 includes a registration interface 207 that facilitates acquisition of the user's personal information such as first and last name, contact information, address, billing information, etc. Layer 201 includes a biometric scanning interface 206 that when invoked brings up a scanner pad on the touch screen of the smart phone. The user scans a thumb or fingerprint into the system for security verification matching in addition to PIN and password authentication. A user may be prompted to scan a thumb or fingerprint and enter a valid PIN and password combination before using any of the features or functions of the digital wallet application. Once a user is registered and setup for authentication, that user may access the features and functions of the digital wallet application on the smart phone.

Before accessing any features or functions, application 200 uses a security layer 202 to authenticate the user. Security layer 202 includes a login interface 207, which is presented to the user for logging into the system. The login routine may include entry and verification of a PIN and password combination. A PIN and password may be stored on the digital wallet on the smart phone in encrypted format. When the user logs into the application the application matches the information entered by the user to the information on file for that user. In addition to a login process, security layer 202 includes a biometric scanner interface 210 that presents itself in the touch screen for the user to scan in a fingerprint or thumbprint.

In one embodiment the scanned print is matched to a finger or thumbprint on file inside the smart phone. In another embodiment the match is performed online where the thumb or fingerprint is stored in an accessible database. It is noted herein that more than one user may register and setup a separate account using the same smart telephone. More than one user may also be valid users for a single account as long as the card data accessed has both users listed as valid card holders. In one embodiment a validation screen appears after login data is entered into the login interface and a thumb print or fingerprint is scanned into the device through the biometric scanner. The base function of the biometric scanner is enabled by smart chip 114 described above in the description of FIG. 1.

Application 200 includes a read/write/scan layer 203. Layer 203 contains a card reader program supported by hardware (Magnetic Stripe reader 102) on the smart phone and a card writer program supported by hardware (Magnetic Stripe writer 105*ab*) on the smart phone. In one embodiment layer 203 includes an OCR image scanner interface 213 supported by hardware. A user may use the image scanner to scan in whole cards to furnish the look of the card and to read card data located in the card memory. A user may also take a photograph of the card and upload it into the smart phone.

Application 200 includes a communication layer 204 that contains all of the protocols for accessing the Internet using any one of several access networks. Layer 204 includes a wireless fidelity (WiFi) component 217 for accessing the Internet through a WiFi network. Layer 204 includes an EDGE component 218 for accessing the Internet through EDGE technology (3G radio). Layer 204 includes a standard Internet access component 216 for accessing the Internet directly. Layer 204 includes a 3G cellular component 219 for accessing a wireless carrier network, which may include Internet access services. Layer 204 also includes an automated transaction machine (ATM) component 215 for enabling access to ATM network terminals. Application 200 includes a transaction layer 224 for aiding the transaction process, especially ATM transaction processing. Layer 224 includes a transaction support module 225 for supporting automated transaction processing over networks such as the ATM network. Application 200 contains a processing layer 205. Layer 205 includes a process 222 for biometric scan lookup and match of finger or thumbprints. Layer 205 includes a PIN lookup and match process 223. Layer 205 includes a user verification operation that combines PIN, password and biometric scan matching during a login to access feature and functions of the digital wallet application 200.

Application 200 may be provided on a digital medium that comes with the smart phone package or it may be downloaded to a smart phone that supports the system of the invention with the appropriate hardware. The minimum hardware requirements are a smart chip enabling biometric scanning though a touch screen interfaces, a card magnetic stripe reader, and a card magnetic stripe writer. An image scanner is optional hardware.

Figure 3:
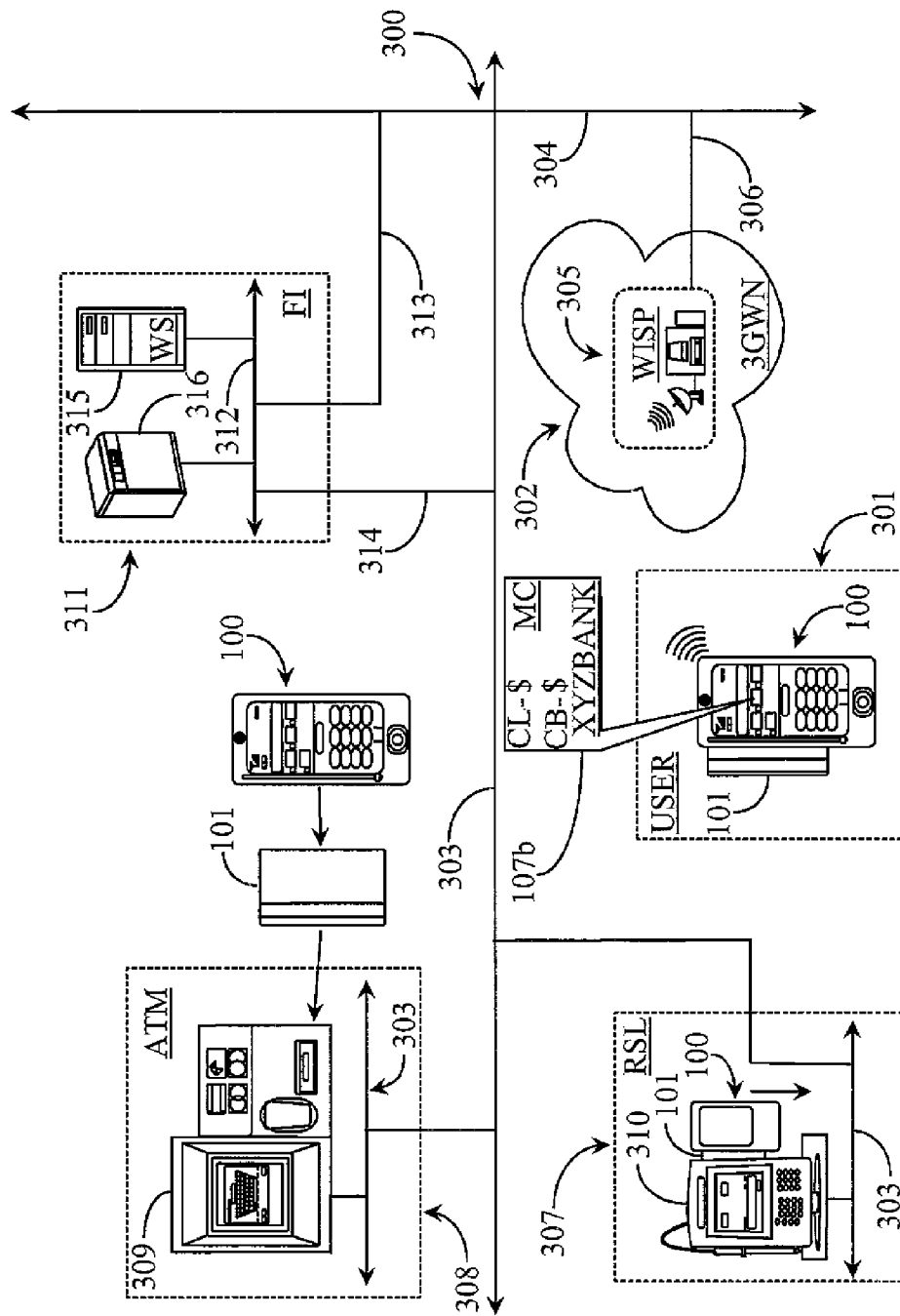
FIG. 3 is an architectural overview of a transaction network supporting a digital wallet application on a smart phone according to an embodiment of the present invention.

FIG. 3 is an architectural overview of a transaction network 300 supporting a digital wallet application on a smart phone according to an embodiment of the present invention. Network 300 includes a 3G wireless network (3GWN) 302 and a connected user 301 operating digital smart phone 100 with internal transaction card blank 101. Phone 100 connects to the Internet 304 through a wireless Internet service provider (WISP) 305 connected to Internet backbone 304 by an Internet access line 306. Network 302 may include satellite services and 3G cellular services. Internet access for phone 100 is, for the purpose of this discussion, for online shopping and transacting using the digital wallet application.

Network 300 includes a transaction network 303 such as an ATM network. Transaction network 303 supports various transaction terminals such as an ATM machine terminal location 308, which may be a bank ATM machine, a store-based machine or a machine supported in any retail or business setting. Location 308 includes a standard ATM machine for banking services such as depositing and withdrawing funds or transferring cash from one account to another. Transaction network 303 supports various retail sales locations (RSLs) such as RSL 307. RSL 307 includes a retail sales transaction terminal 310.

Network 300 includes a financial institution (FI) 311 accessible through the Internet (304) via access line 313, and through the transaction network (303) via access line 314. FI 311 includes an account database 316, which represents any data repository adapted to contain account information for users of the digital wallet application on a smart phone such as phone 100. FI 311 includes a Web server (WS) 315 that enables users to access account information online through the Internet network.

In practice of the present invention, user 301 may use smart phone with card blank 101 to transact over the network. For example, after login to the digital wallet application from phone 100, the user may view pre-loaded card data sets in a card selection interface analogous to data sets 107 (a-d) described further above. In this example, the user has selected MasterCard 107b from XYZBANK. The card view includes visible summary data or metadata such as credit line amount (CL-$) and card balance amount (CB-$) to help the user make a good selection. This information may be periodically updated to smart phone 100 when a user selects a credit card or other transaction card that is connected to an account that is accessible over the network. The digital wallet application includes all of the required links for establishing network connections with the account holder institutions so the most current summary data is always available before a user initiates a transaction using a selected card. The card data and account information 107b is pre-loaded into smart phone 100 and after selecting the card for use, the user may write the required card data onto the magnetic stripe of card 101 so that the internal data card can be used as the MasterCard.

With respect to ATM location 308, a user may eject internal data card 101 from smart phone 100 after the pre-loaded transaction card data is written to the card. Internal card 101 may then be used in ATM machine 309. With respect to RSL 307, a user may partially eject card 101 after it is loaded with the required data from smart phone memory. The user may swipe card 101 into retail sales terminal 310 while it is partially ejected from smart phone 100 but still in communication with the smart phone. In this embodiment the front and back face view of the related MasterCard, which includes the user's signature may be displayed on the OLED screen of phone 100 while the transaction is in process.

In one embodiment communication between phone 100 and a retail sales terminal may be wireless if the sales terminal is adapted for wireless transacting. In this case a simple near proximity wave of the smart phone is sufficient to transfer the MasterCard data for use in the transaction. Also in this embodiment, the retail sales terminal may wirelessly transfer a receipt for the transaction back to phone 100 after performing the transaction. The preloaded information on phone 100 may also be used for conventional online transacting through ecommerce Websites.

Figure 4:
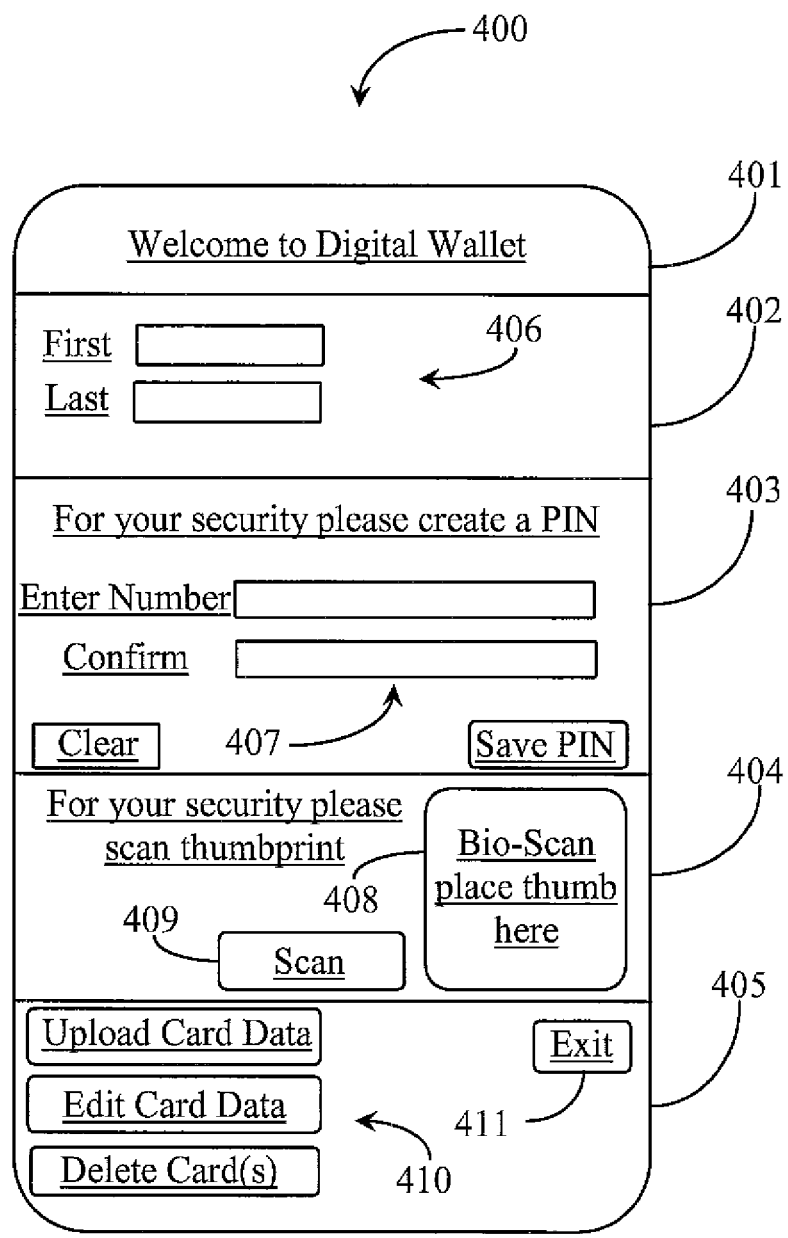
FIG. 4 is a screenshot of a start interface for setting up authentication access to information on a digital wallet application installed on a smart phone.

FIG. 4 is a screenshot of a start interface 400 for setting up authentication access to information on the digital wallet application installed on a smart phone. Start interface 400 includes a welcome bar, which may or may not be personalized to the user. The user may enter a first and last name into a first screen 402 of start interface 400 using data entry fields 406. When a user supplies both first and last name, the application opens an account for this user. Subsequently, only a username and password or PIN is required for authentication in addition to the extra security measure of matching the user's fingerprint or thumbprint.

A PIN creation screen 403 provides the facility for setting up a PIN for user access. Data entry fields 407 enable entry of a PIN and confirmation of the entered PIN. The same or similar screen may be used to setup the user's password as previously described above. Screen 403 includes a clear button for clearing the information entered and a save button for saving the created PIN to memory on smart phone, which is accessible to the digital wallet application installed on the phone.

A biometric scan screen 404 includes a virtual (touch screen based) biometric scanning pad 408 and a scan button 409. Scan button 409 may not be required to practice the present invention as long as the user places his or her thumb, for example, in the correct position on the touch screen. In one embodiment, the biometric scan pad is a hardware supported device built into the smart phone. For example, a camera device may double as a fingerprint scanner. Once the user enters a thumbprint for the first time, subsequent authentication will require that the user submit the thumbprint scan each time the user wishes to access the digital wallet application. A time constraint may be imposed on a digital wallet session requiring the user to re-authenticate with the thumbprint match to continue the transaction session. This security measure reduces the chance that another user may pick up the phone with personal data displayed on the touch screen. Similarly, data written to internal card 101 may be automatically purged from the card after a certain period deemed sufficient for one transaction. This security measure prevents card 101 from being used without knowledge of the valid user.

Once all of the information has been added to authenticate a user, that user may access the digital wallet application by login, PIN/Password authentication, and print submission and successful match. Screen 405 enables the user to initiate upload of card data, typically by reading a card using the card reader on the smart phone through one of options 410. An option for editing card data that is already pre-loaded into phone 100 is one of options 410. An option for deleting card data and information is also provided in options 410. An exit button enables the user to safely exit the digital wallet application and features. In one embodiment digital wallet card data must be periodically loaded into the digital wallet application to ensure its presence for transacting using the phone or internal data card. In one embodiment all of the pre-loaded information is purged from the smart phone after a specific period of time such as two days or a week. This parameter may be adjustable by the user. This may prevent latter theft if the smart phone is misplaced or lost and found by another user intent on lifting the account information from the internal data card or from the memory of the smart phone.

Figure 5:
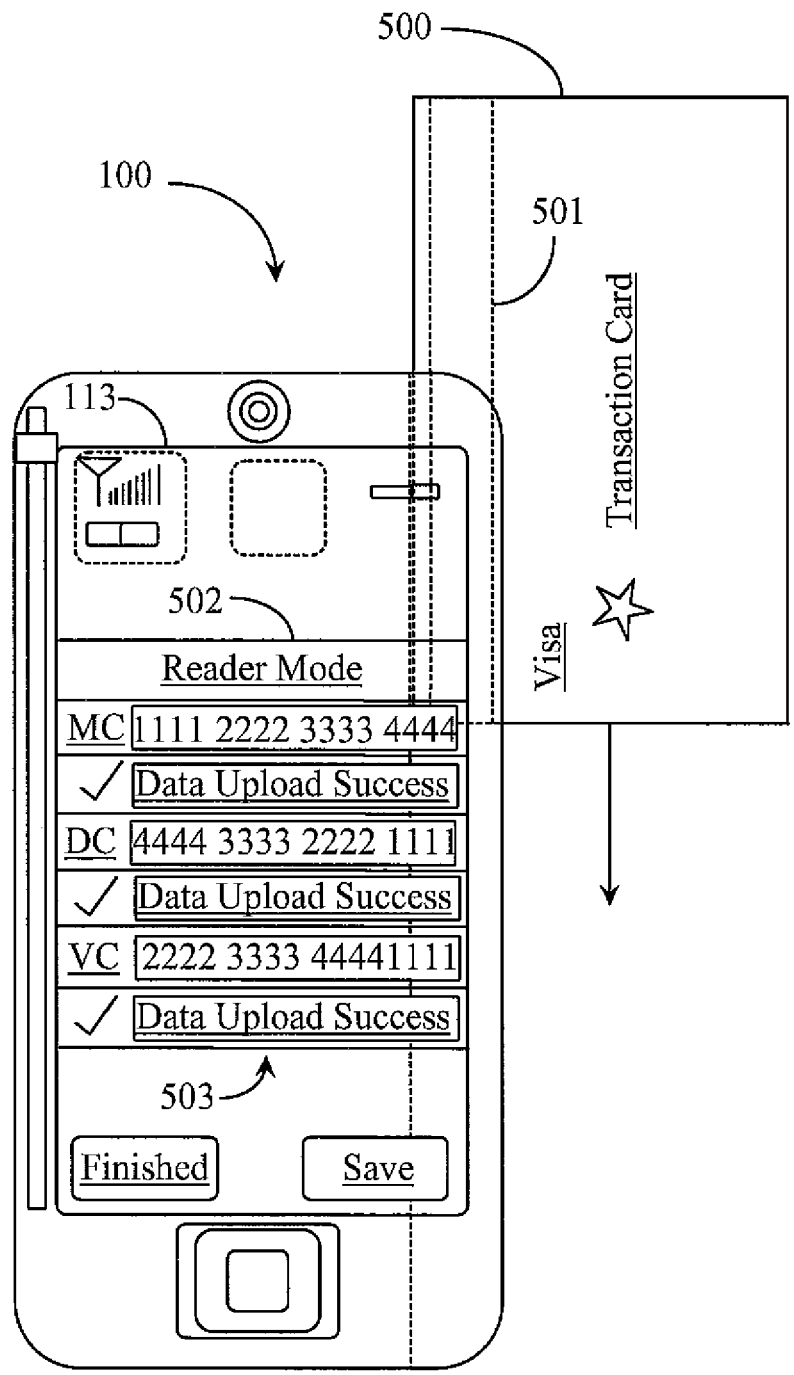
FIG. 5 is an elevation view of a smart phone in reader mode according to an embodiment of the present invention.

FIG. 5 is an elevation view of smart phone 100 in reader mode according to an embodiment of the present invention. Smart phone 100 is set to reader mode for uploading card data to memory for latter use. A reader mode interface 502 may be displayed on the OLED screen of phone 100. A transaction or credit card 500 owned by the user may be swiped through the card reader slot on the side of the phone. The reader captures all of the appropriate data from a magnetic stripe 501 of transaction card 500. A card dataset listing 503 includes the type of card read and displays the number of the card. For security reasons, only the first part of a credit card number may be displayed in the interface.

For each data set uploaded through the card reader, the system provides a visual indication of the success or failure of upload through the card reader device on the phone. Another way to upload data into the digital wallet application may be to supply the data through a server to phone connection, for example, between the phone and the issuing bank or FI. In any event, provision of the data read through the card reader on the phone may be supplemented with account data from the issuing bank or FI hosting the user's account.

In this particular view, the user has successfully uploaded a MasterCard dataset, a Discovery Card dataset, and a Visa Card dataset. This information may also be manually typed into the interface by a user using any suitable input device including the touch screen interface. The user may subsequently select any one of these to use in a transaction. At the bottom of the visual interface, a finished button and a save button are provided. Data may be manually purged from the memory of smart phone 100 by the editing screen described further above. After upload is finished and the data is saved, the user may re-authenticate to select a card data set to use in a transaction. The data selected is written to the internal card in one embodiment via the card writer mechanism. In one embodiment the card reader and writer are combined into one hardware component built into the smart phone. In one embodiment they are separate components as illustrated in the examples of this specification.

Figure 6:
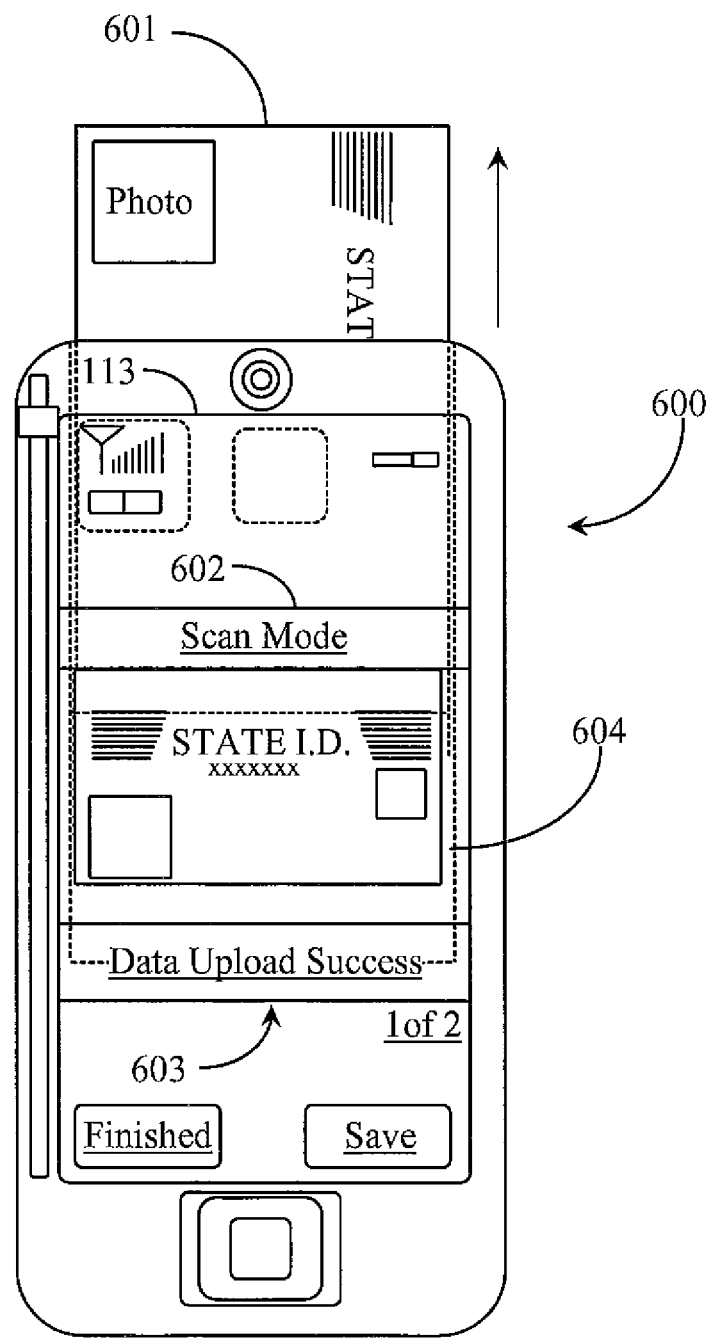
FIG. 6 is an elevation view of a smart phone adapted with an image scanner according to one embodiment of the present invention.

FIG. 6 is an elevation view of a smart phone 600 adapted with an image scanner according to one embodiment of the present invention. Smart phone 600 includes an image scanning bay 604 for scanning transaction card and identification card images into the smart phone memory. In this example an OLED touch screen 603 displays the front view of a state-issued identification card 601, which is fed into scanning bay 604 while the phone is set to scanning mode as indicated by indicia 602.

In this embodiment smart phone 600 may also include the card reading and writing interfaces. To scan in a transaction card or state ID card a user first authenticates by entering a PIN/password combination and scans in a biometric such as a thumbprint for example. In this way a user may present an authentic identification card by display instead of pulling out the original card during a transaction. Tellers or other authorized personnel may also view the signature of the user such as the signature found on the rear view of such cards. A user may be using a credit card in the form of an internal data card while simultaneously displaying identification. A user may scan in several different cards and may be able to call each view up on the display as needed.

After the secure data is unlocked, the user can then view each of their credit card accounts in real-time via encrypted internet connection via Wi-Fi, EDGE, 3G, or any other viable wireless internet connection. This real-time access to their accounts provides the user with key information supplied by the issuing bank/creditor. This information could contain important account information such as the user's real-time account balance, credit limit, available credit, and interest rate for each credit card, charge card, or check card. The user can then check the checkbox associated with the credit card they would like to use for a particular transaction.

In one embodiment, the scanner includes a reading interface and once the card is loaded the card scanning/reading software is activated and the cards graphical data and textual data are read. This method allows credit cards, charge cards, check cards, ID cards and passport cards to be scanned and fully imaged, storing all the graphical images, barcode images, and textual data automatically to a user specified folder(s).

Figure 7:
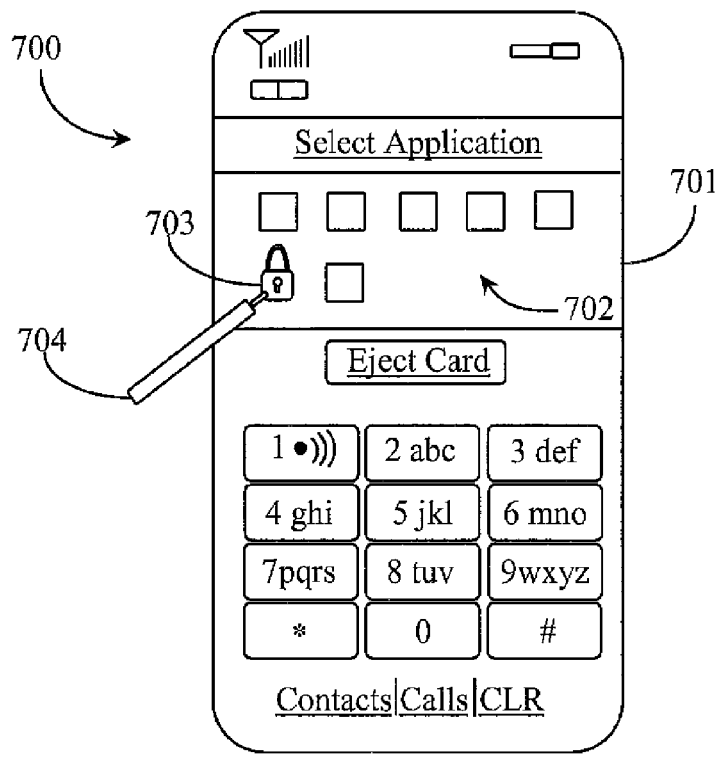
FIG. 7 is a front view of a smart phone screenshot illustrating available applications accessible through interaction with displayed shortcuts.

FIG. 7 is a front view of a smart phone screenshot 700 illustrating available applications accessible through interaction with displayed shortcuts. Screenshot 700 includes a window 701 for displaying the various applications installed on the smart phone. Shortcuts 702 may be selected via touch or via a stylus pen 704. A locked icon 703 represents a shortcut to the digital wallet application. A user selecting this shortcut may be required to authenticate by logging into the digital wallet application and scanning in a biometric such as a thumbprint before any access to personal data may occur.

Figure 8:
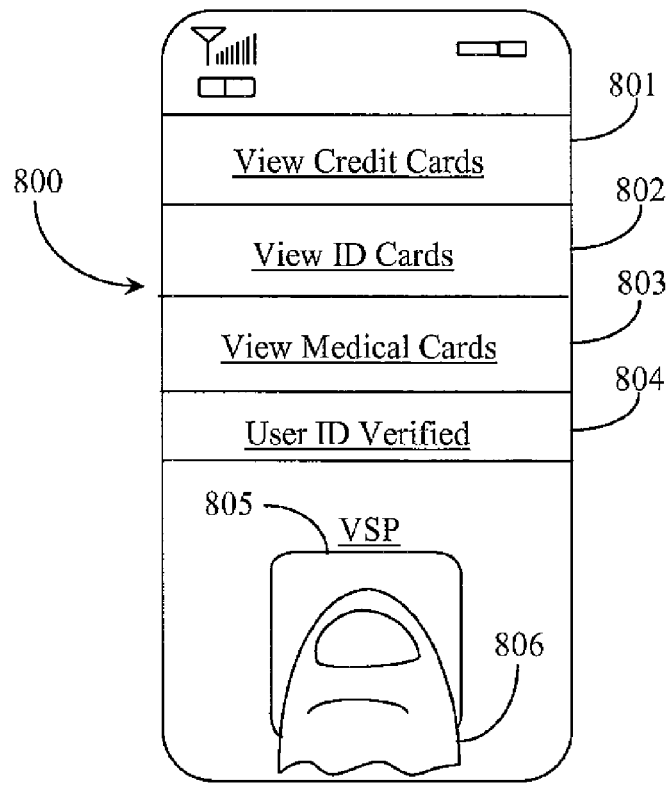
FIG. 8 is a front view of a smart phone screenshot illustrating various options for viewing personal information.

FIG. 8 is a front view of a smart phone screenshot 800 illustrating various options for viewing personal information. Screenshot 800 includes a displayed option 801 for viewing Credit Card information. Screenshot 800 includes a displayed option 802 for viewing identification card information. Screenshot 800 includes a displayed option 803 for viewing medical card information.

In order to view the information a user first scans in a finger or thumbprint as indicated by finger 806 placed on scanning pad 805. In one embodiment the print is matched with a print stored on the smart phone. In another embodiment the print is matched online using a verification service provider (VSP). In this case the print may be stored in an accessible data repository (not illustrated) maintained by the service. In one embodiment both options are practiced whereby the user may authenticate off line by matching a scanned print with one stored on the phone and online by matching the print to one stored in an accessible repository maintained by a VSP.

Figure 9:
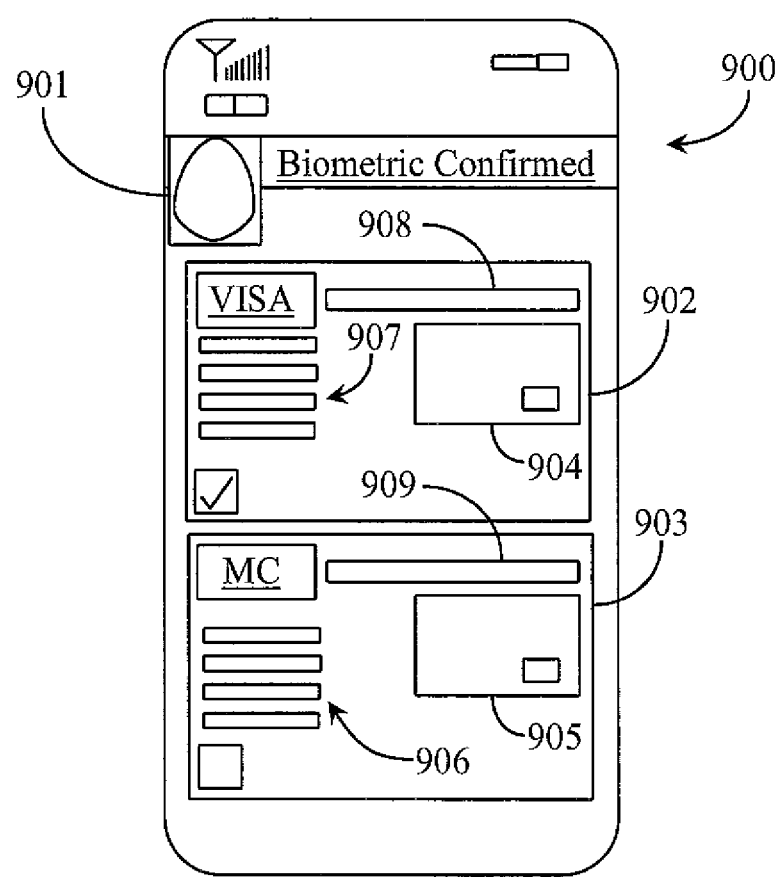
FIG. 9 is a front view of a screenshot illustrating a credit card viewing interface according to an embodiment of the present invention.

FIG. 9 is a front view of a screenshot 900 illustrating a credit card viewing interface according to an embodiment of the present invention. Screenshot 900 includes a biometric match confirmation display 901 showing the user's print and a message indicating a successful match. Window 902 contains all of the information associated with the user's Visa card including credit card number 908, credit account information 907 including issuing bank, credit limit (CL), credit balance (CB), and current interest rate on the card. A front view 904 of the card is also displayed in window 902. In one embodiment the rear view of the card may be the default view. A user may be able to change the credit card face view from front view to rear view by interacting with the display.

Window 903 contains all of the information associated with the user's Master card (MC) including credit card number 909, credit account information 906 including issuing bank, credit limit (CL), credit balance (CB), and current interest rate on the card. The front view 905 of the Master card is also displayed in window 903. In this example, the user has selected the Visa card for use in a transaction as indicated by a marked checkbox. The user has passed authentication including biometric match and may now use the card data in a transaction involving the internal data card previously described. The user may write the required data to the internal data card and then use it as the Visa card.

Figure 10:
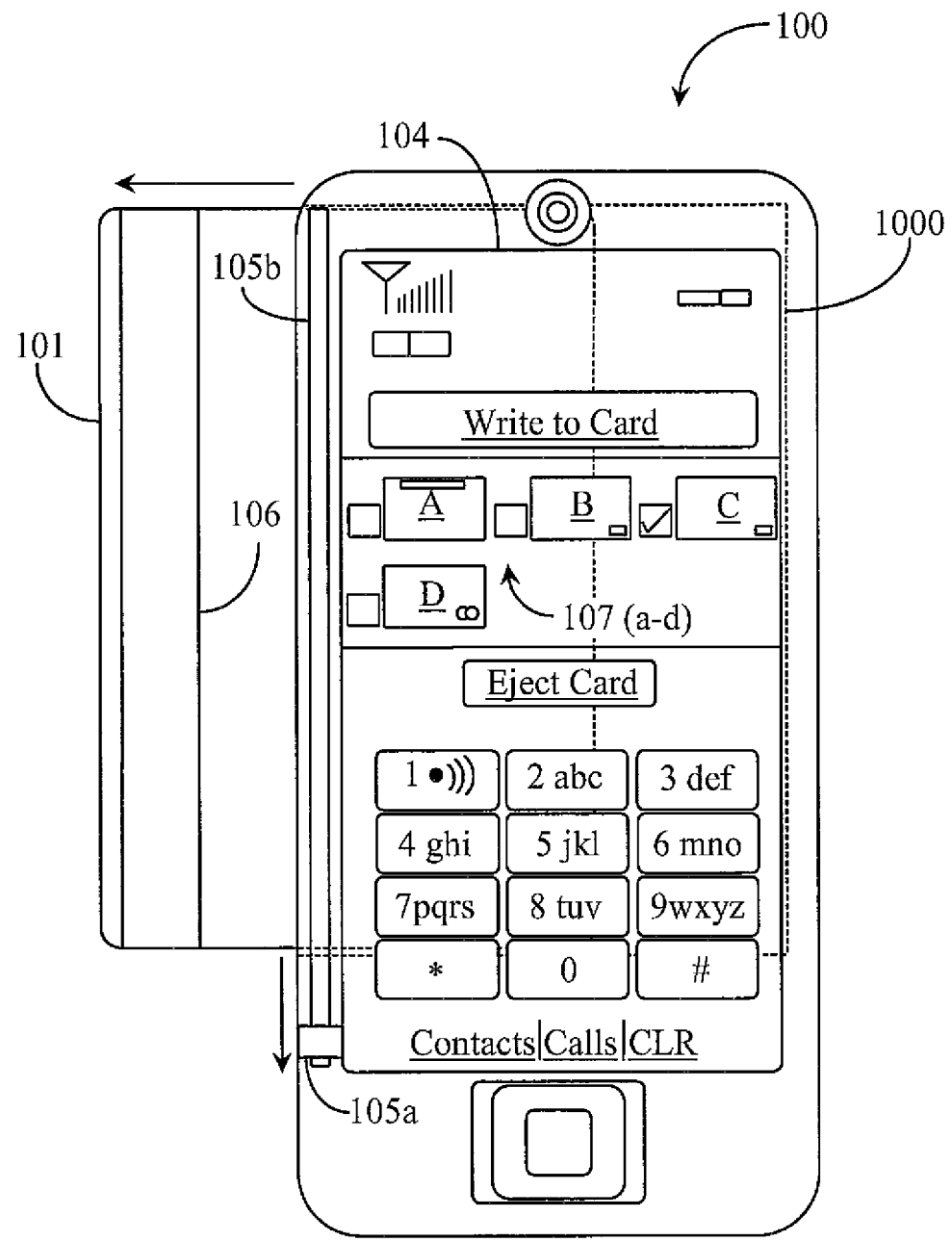
FIG. 10 is a front view of a smart phone according to an embodiment of the present invention.

FIG. 10 is a front view of smart phone 100 according to an embodiment of the present invention. In this example OLED touch screen 104 displays several pre-loaded cards 107 (a-d) presented for user selection. In this example an option "Write to Card" is presented so the user may set the phone to write mode and may write the card information of the selected card to magnetic stripe 106 on internal data card 101. The user, with internal data card 101 fully inserted into card bay 100, moves write button 105a down in the direction of the arrow to write the data of the selected card to the internal data card.

An option for ejecting internal data card 101 is then manipulated in order to eject data card 101 from bay 1000 for use as the selected card pre-loaded into the digital wallet application loaded onto smart phone 100. Internal card 101 may be ejected in the direction of the arrow. In one embodiment interacting with the eject card graphical icon on the smart phone touch screen partially ejects the internal data card to a position exposing the magnetic stripe for use in a retail transaction terminal. In one embodiment the card may be fully ejected for use separately from smart phone 100.

Figure 11:
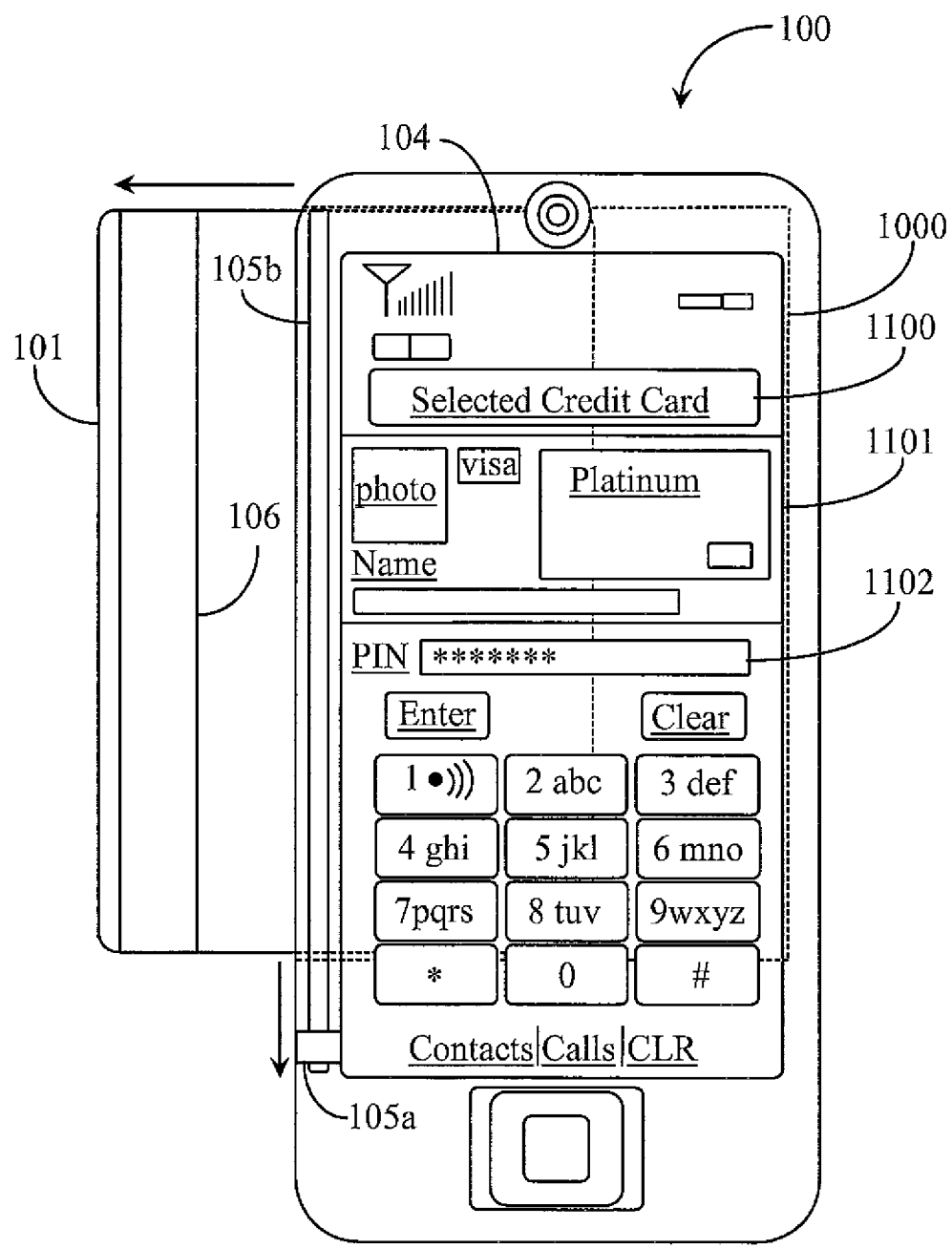
FIG. 11 is a front view of a smart phone according to an embodiment of the present invention.

FIG. 11 is a front view of smart phone 100 according to an embodiment of the present invention. Internal data card 101 is shown partially ejected and ready for use in a transaction. A window 1101 displays the front face view of the card, the photo of the user, and the name of the user. A graphic indicator 1100 identifies the card as the card selected for use in a transaction. The user may be required to enter a bank PIN to proceed with the transaction using the internal data card. An interface 1102 is provided for entering a PIN.

When the Digital Wallet's internal data card (101) is exposed the user is ready to make a retail sales transaction. An image of the card along with the cards credit card number and photo of the user appears and may remain in the Digital Wallet's screen 1101 until the transaction is complete. If the user plans on continuing to shop, this feature can be turned off which will enable them to leave the credit card graphics visible in the Digital Wallet's screen for a specified amount of time. As an added security measure the user may be required to enter their secret pin code in order for the credit card to be active and ready to complete a sales transaction. This feature can also be user specified, allowing them to turn this feature on or off for convenience, or to leave the card active for a specified amount of time, for example, ten minutes, three hours, etc.

Figure 12:
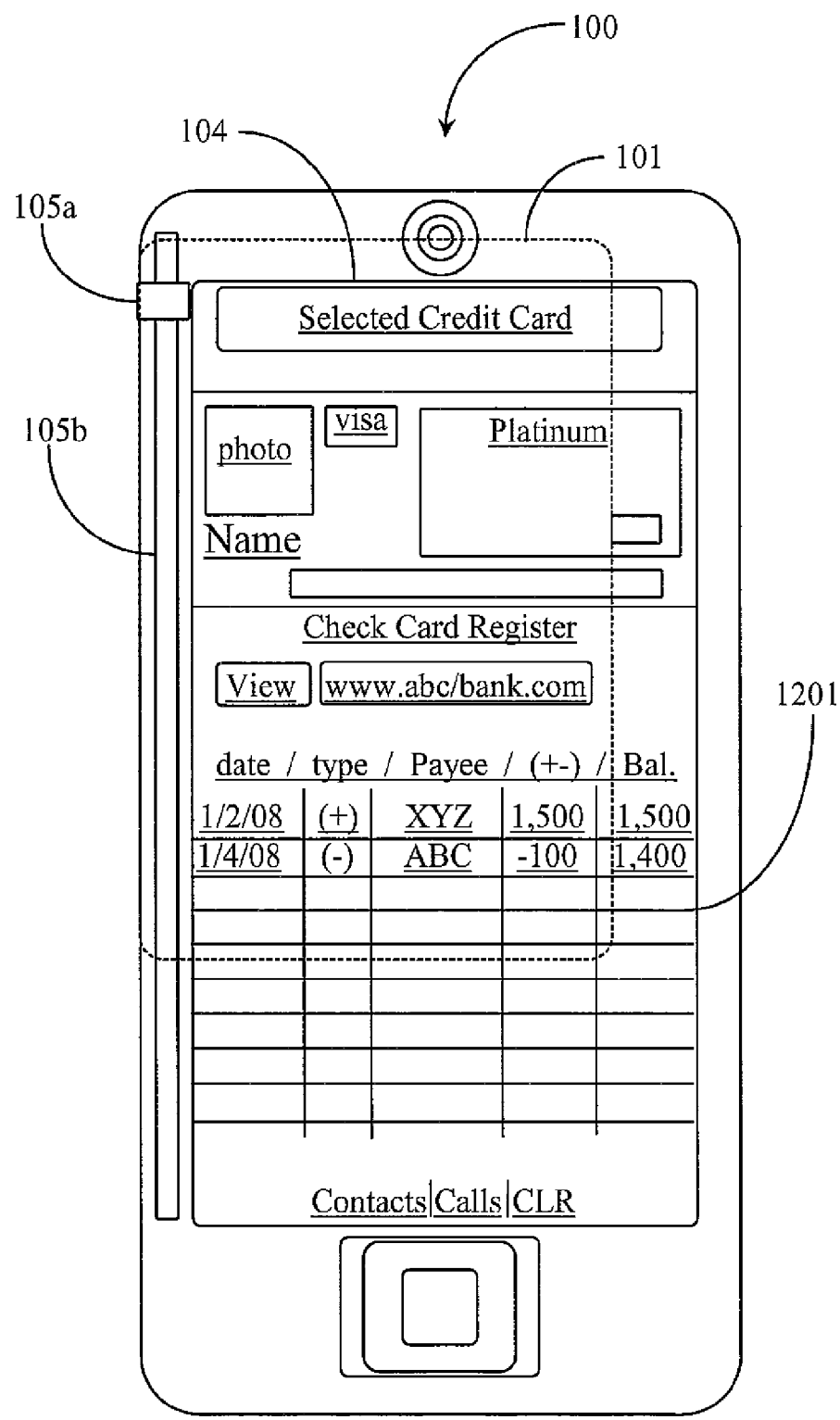
FIG. 12 is a front view of a smart phone according to an embodiment of the present invention.

FIG. 12 is a front view of smart phone 100 according to an embodiment of the present invention. Phone 100 has an internal data card (101) fully inserted therein as illustrated by broken boundary. If the selected card can be used as a debit card, for example, a Visa debit card, a user may invoke the Digital Wallet's automatic check register feature 1201, which links the users bank issued check card with their bank account in real-time via encrypted internet connection using Wi-Fi, EDGE, 3G, or any other viable wireless internet protocol. Check register 1201 has a view toggle option (View) and a link to the issuing bank (www.abc/bank.com).

Figure 13:
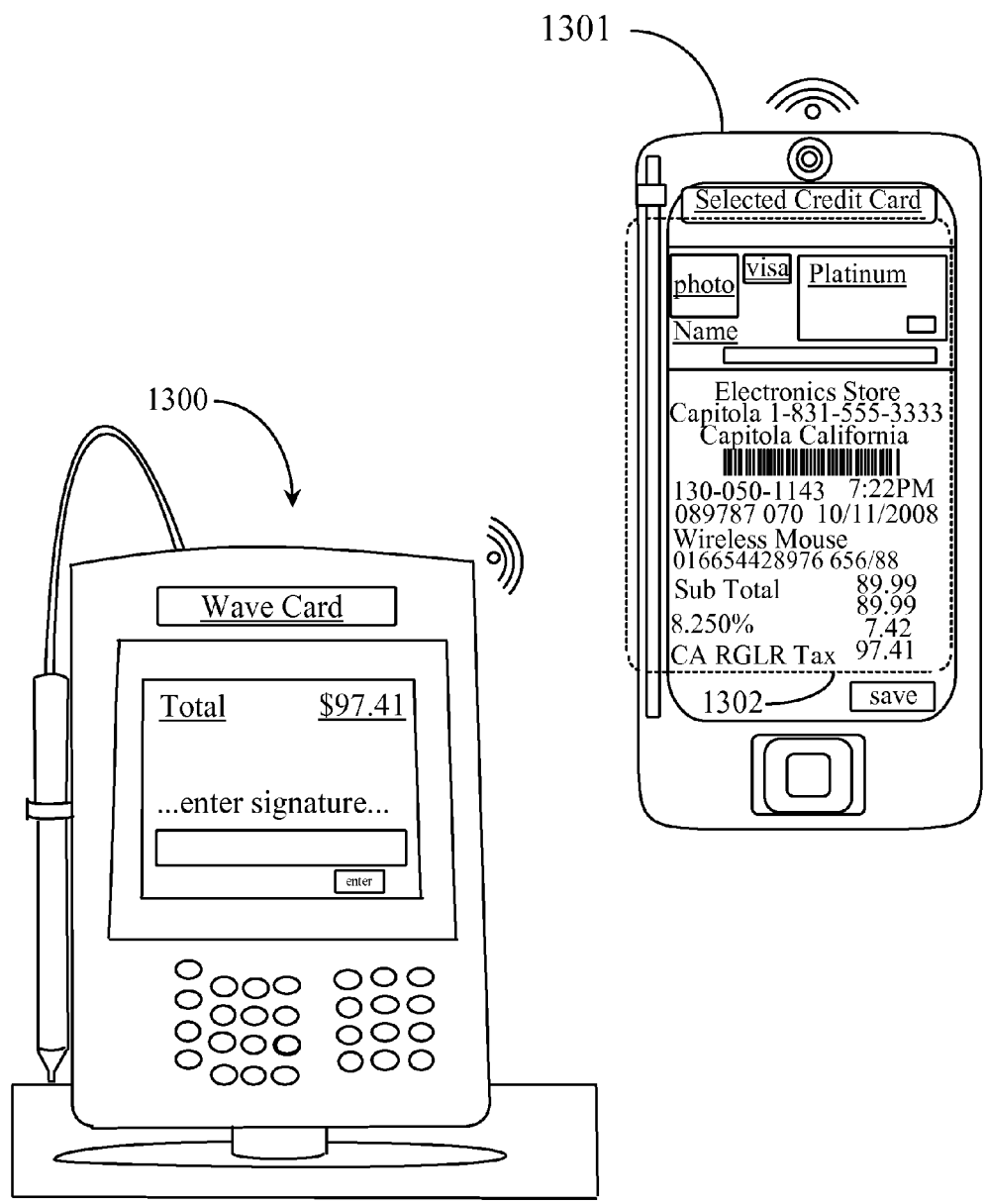
FIG. 13 is an elevation view of a smart phone being used in a wireless capable retail transaction terminal according to one embodiment of the present invention.

FIG. 13 is an elevation view of a smart phone 1301 being used in a wireless capable retail transaction terminal according to one embodiment of the present invention. Smart phone 1301 may be analogous to phone 101 or any of the smart phone versions described thus far. Phone 1301 has a wireless transaction feature that works with a wireless capable retail transaction terminal 1300. In this case the internal data card may not be required as smart phone 1301 may connect wirelessly to a wireless capable transaction terminal. In such an embodiment smart phone 1301 may function as a combination card or hybrid card, employing both a contact card (via its internal data card) and contactless technology in the same device. In this embodiment the smart phone 1301 may also contain two different types of chips as described further above (RFID Chip and smart chip).

In this embodiment smart phone 1301 may be operated as a contactless smart card containing an embedded smart chip with internal memory, secure microcontroller or like intelligence, and a small antenna to communicate using the RFID chip. The RFID chip enables smart phone 1301 to communicate with specially equipped RFID card reading terminals or devices such as transaction terminal 1300. The RFID chip may comply with ISO 14443 (Proximity Card) standard or the ISO 15693 (Vicinity Card) standard, or any other viable up-to-date contactless card integrated circuit ISO standard, or wireless Radio Frequency (RF) protocol used for secure payment transactions.

The smart chip may operate according to the international standards set for contactless smart chips, such as ISO/IEC 14443 or any other viable up-to-date smart chip standard. In one embodiment a single, dual-interface chip that manages both functions of biometric scanning support and RF communications could also be used. It is also noted herein that the smart phone chips illustrated in FIG. 1 and in other illustrations in this specification may be located anywhere within the body of the smart phone 1301 without departing from the spirit and scope of the present invention.

In one embodiment transaction terminal 1300 is a new type of RFID credit card reading terminal that can communicate with smart phone 1301 after the user completes the contactless transaction by wirelessly sending the sales receipt directly to the phone at the conclusion of the transaction. The terminal may transfer the receipt using wireless RF technology, such as Bluetooth™, Ultra Wide Band, or any other viable RF protocol or other wireless technology capable of wirelessly pairing/communicating with smart phone 1301. During the process, a secure encrypted handshake is performed between the RFID transaction terminal and the user's smart phone during the transaction. The wireless connection established is terminated at the completion of the sales transaction. Once the receipt is transferred to the user's phone it is automatically saved to a receipt folder (not illustrated), under the folder associated with the credit card that the user selected for performing the sales transaction. In this example, a sales receipt 1302, resultant of a transaction made with smart phone 1301, is displayed on the OLED touch screen after being wirelessly transmitted from transaction terminal 1300 to phone 1301.

Figure 14:
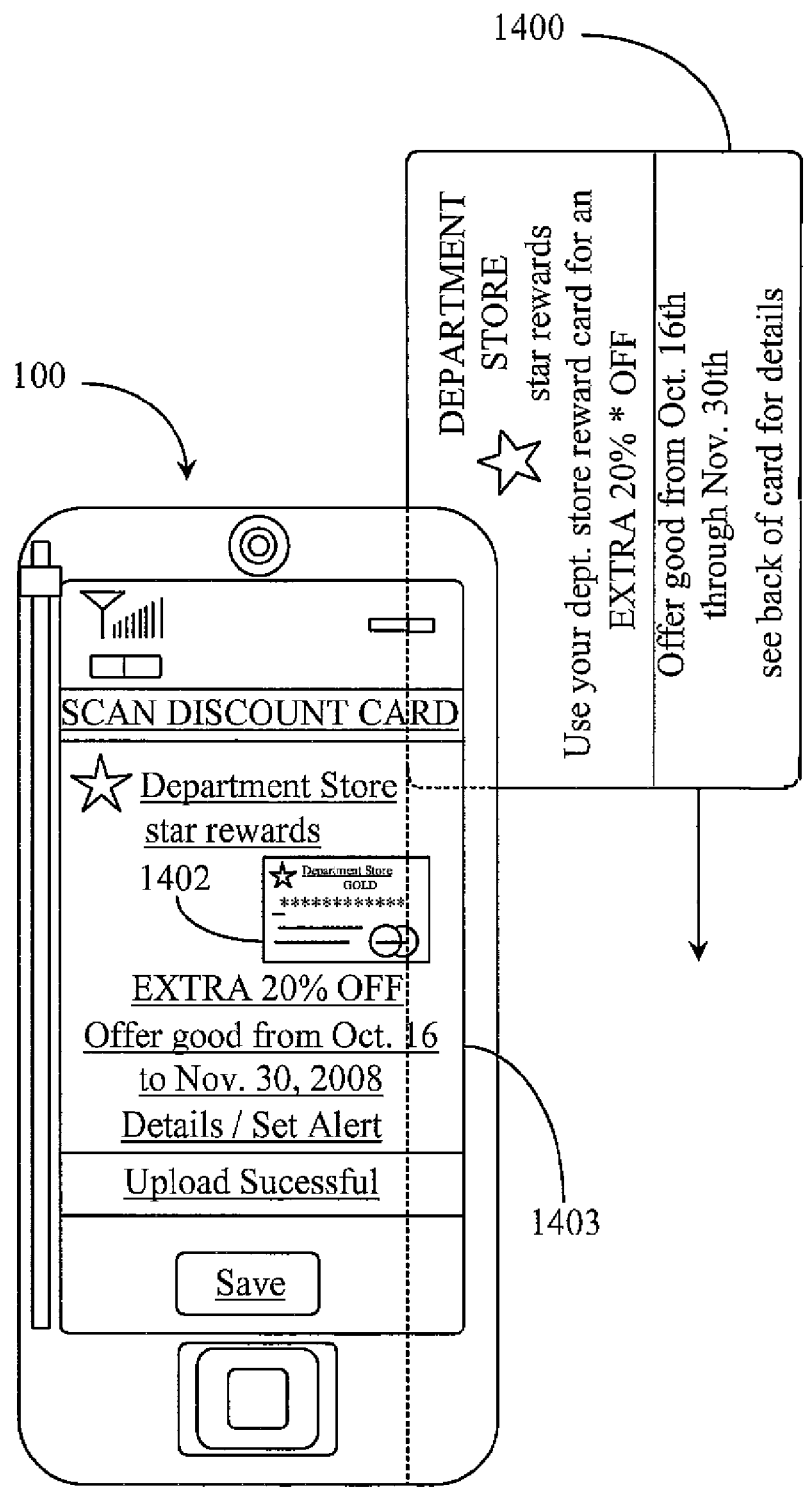
FIG. 14 is a front view the smart phone of FIG. 1 according to an embodiment of the present invention.

FIG. 14 is a front view of smart phone 100 of FIG. 1 according to an embodiment of the present invention. In one embodiment smart phone 100 may be enabled to read/scan/upload special retailer discount incentive cards, such as those issued by large retail chain department stores. In this example a department store discount card 1400 is read into phone 100 by swiping the card through the card reader slot in the direction of the arrow. In this case the reader may also be adapted to scan in bar codes.

Once the card has been read/scanned, the user may set a reminder (or it may be automatically set) to notify them with an alert sent to their digital wallet screen or email, the alert reminding that their discount incentive card/offer is going to expire on a certain date. The reminder can be user defined, allowing them to turn the feature on/off, or to set a desired alert time, for example; one week before expiration, two weeks, etc. Screen 1403 shows the card offer data and options for viewing details and for setting an alert.

Figure 15:
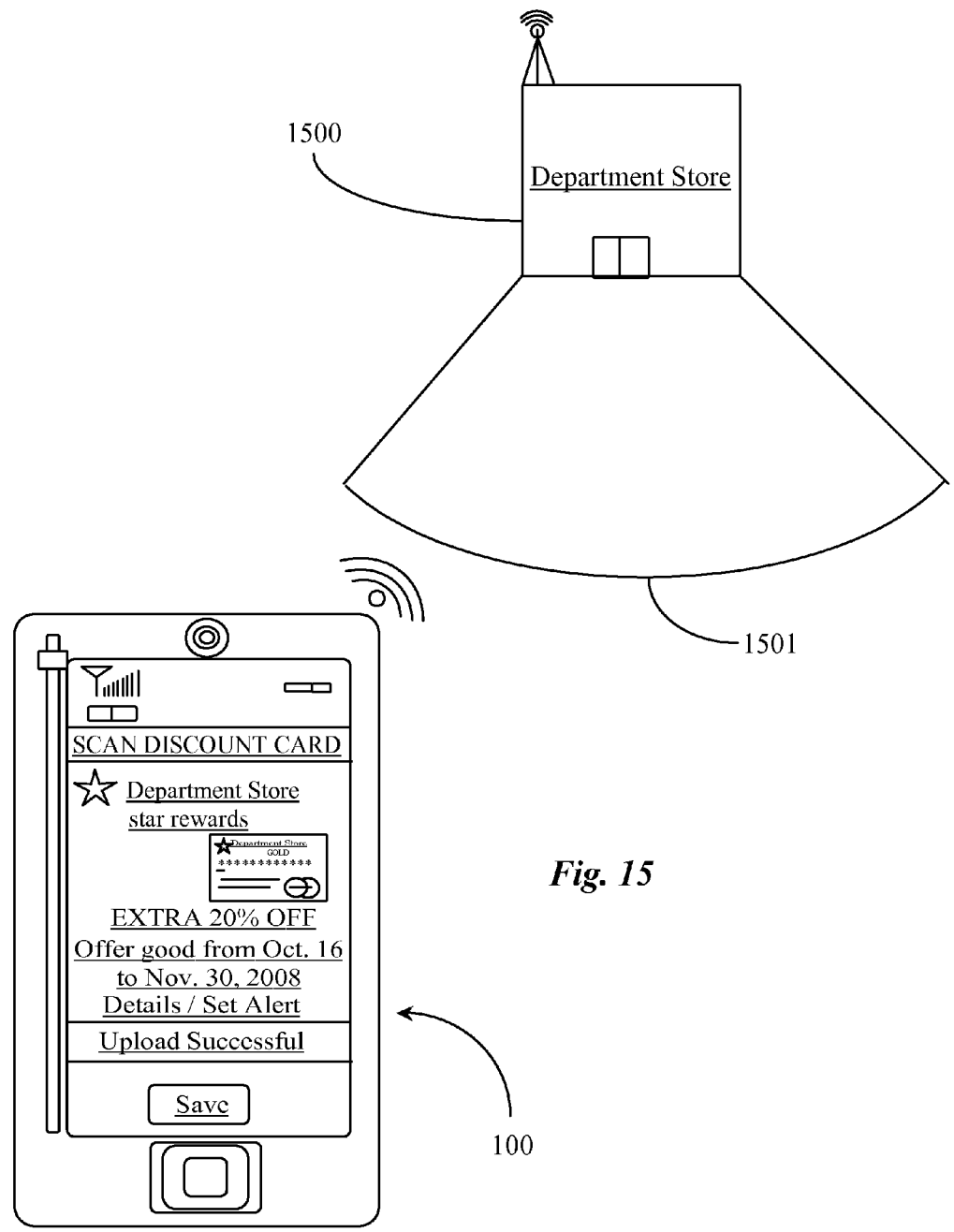
FIG. 15 is a block diagram illustrating the smart phone of FIG. 1 used in the vicinity of a department store according to an embodiment of the present invention.

FIG. 15 is a block diagram illustrating smart phone 100 of FIG. 1 used in the vicinity of a department store according to an embodiment of the present invention. Department store 1500 may be any department store or any retail outlet that carries discount cards such as card 1400 of FIG. 14. Phone 100 has a department store card pre-loaded into the digital wallet application. Department store 1500 is the issuing store. When the user has scanned and uploaded their retailer-issued credit cards, such as their department store credit card, and when they are within a certain proximity 1501 to department store 1500, the digital wallet application detects the wireless RF signal (Wi-Fi, Ultra-Wideband, Wireless USB, Bluetooth, or any other viable wireless RF protocol) emanating from the store. The application may then ping back a unique encrypted code that identifies the user as a credit account holder with the company.

The user may then receive special retailer discount promotions sent directly to their smart phone (100). The offers could be aimed at the user's account status level, similar to the physical discount incentive cards issued by retailers today, or customized to the user's spending patterns. The user may go into the store and shop or may be re-directed to the stores Website if available. The recognized user may use the pre-loaded department store discount card or regular credit line card to purchase items over the network or perform transactions with wirelessly-enabled sales terminals inside the store. In one embodiment the user may pre-load a discount card and set an alert to remind the user of the offer when the phone detects the wireless signal of the store. In this way as a user travels with the digital wallet application, it may alert the user every time the user comes into proximity of a wireless network of a store wherein the user has a pre-loaded store card or discount offer that has not yet expired or that has no expiration date.

In this case the user is wirelessly identified by the store network as a card holder of the retail dept/store and can subsequently shop for items via the stores intranet website, picking up the items in the store at a special location by brandishing their store receipt, which is displayed on their Smartphone Digital Wallet screen.

Figure 16:
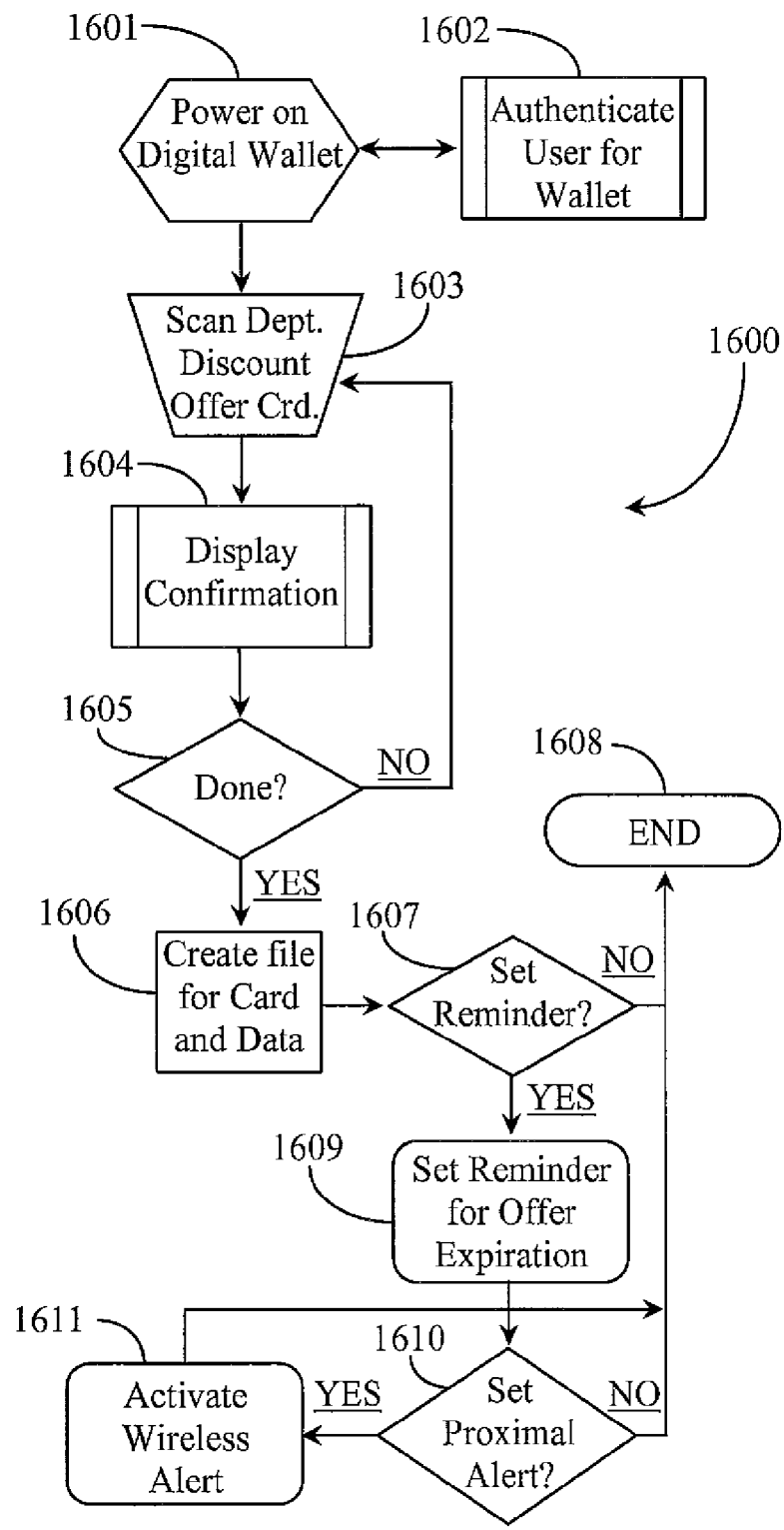
FIG. 16 is a process flow chart illustrating steps for setting alerts for pre-loaded cards according to an embodiment of the present invention.

FIG. 16 is a process flow chart 1600 illustrating steps for setting alerts for pre-loaded cards according to an embodiment of the present invention. At step 1601 the user powers on or loads the digital wallet application installed on the smart phone. In step 1602 the user may be required to enter a password/PIN combination followed by a biometric verification as described previously in this specification to access the digital wallet application features and data.

At step 1603 the user scans a department store discount, credit or offer card into the smart phone. A step 1604 the digital wallet application confirms successful preload of the department store card data. At step 1605 the user determines if he or she is done pre-loading card data. If at step 1605 the user is not finished preloading cards, the process loops back to step 1603 for scanning in the next card. If the user is finished preloading cards at step 1605, then the digital wallet creates a file for each preloaded card in step 1606. Each file may contain card data including bar code, card face front and back (image scanner), information about the issuer, and the terms and expiration data about any offers or discount incentives. The information is displayed at least in summary when a card is selected from the card view menu.

For a department store card that offers a discount or special deal the user may have the option of setting an alert or reminder at step 1607. Such a reminder may simply be an alert that informs the user that the offer will expire on a certain date. The reminder might be a proximity reminder to remind the user when in proximity of a store where the card offer can be used. If the user declines to set an alert at step 1607, the process may end at step 1608. If the user decides to set an alert or reminder at step 1607, then the user performs the task at step 1609. In this example the alert is relative to expiration of the offer. In one embodiment both proximity and expiration alerts may be set and associated to a single card and offer that has an expiration date.

In step 1610 the user may decide whether or not to set a proximity alert. If the user decides to set proximity alert at step 1610, the user activates w the wireless alert at step 1611. In this step the user simply invokes an option [set proximal alert] or some similar command. The digital wallet application will automatically activate the wireless alert so whenever the user is in the proximity of the issuing store and the card is still preloaded into the digital application, the smart phone will detect the appropriate signal and inform the user of the opportunity. Geographic positioning satellite (GPS) technology may be used to detect proximity. In one embodiment the phone detects any wireless signal and attempt to associate the signal with any preloaded card file on a periodic or ongoing basis. The process ends at step '1608 whether or not the user sets a wireless proximal alert.

Once the user has scanned in their discount incentive cards, or wirelessly received them through Proximal RF connection to the retailer, the user can present them to the sales clerk during checkout (during the sales transaction). In this scenario, the user simply selects the retailer discount incentive card or cards they would like to use in their sales transaction and then displays the associated barcode or any other type of code necessary for the sales clerk to scan and register the discount or offer. In one embodiment the user may receive special offer discounts directly into the digital wallet application through email if so enhanced.

In another embodiment, when the user is in proximity to the retail store and is able to connect to the store's wireless RF signal the user can connect to that store's intranet website, allowing the user to shop for product without having to engage in a traditional retail sales checkout process. Because the intranet website would be specific to a particular store, it would include real-time inventory accounting. The store could also send out a GPS signal allowing the user to use a GPS store locator feature to find specific retail stores in their area with wireless intranet shopping capabilities. When the user has made a purchase a receipt is recorded to their digital wallet application, which the user can bring into the retail store where they made their purchase in order to pick up their product in a special pickup area designated for intranet purchases.

In one embodiment multiplexing technology is used to write pre-loaded card data onto the magnetic stripe of the internal data card docked in the smart phone. To write to the internal data card the user simply selects card data via graphical interface rather than having to swipe the card physically with the "magstripe" writer switch located on the smart phone. The user can choose to load all of their credit cards, their bank check card, and their ID. Once the data is loaded, the user ejects the internal data card and will have access to any of the data. Other methods other than multiplexing may be used to accomplish the same function of writing more than one card data set onto the magnetic stripe of the internal data card.

Figure 17:
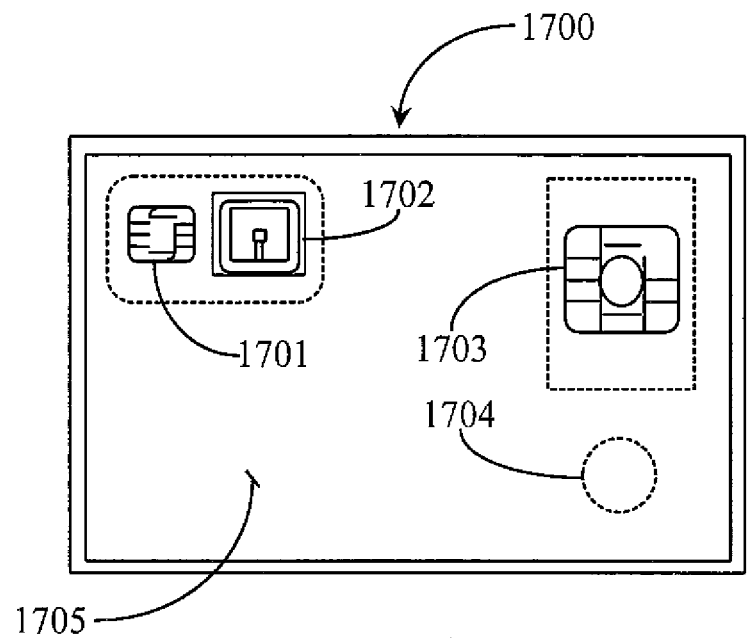
FIG. 17 is a front view of a radio frequency-enabled smart card according to an alternate embodiment of the present invention.
Figure 18:
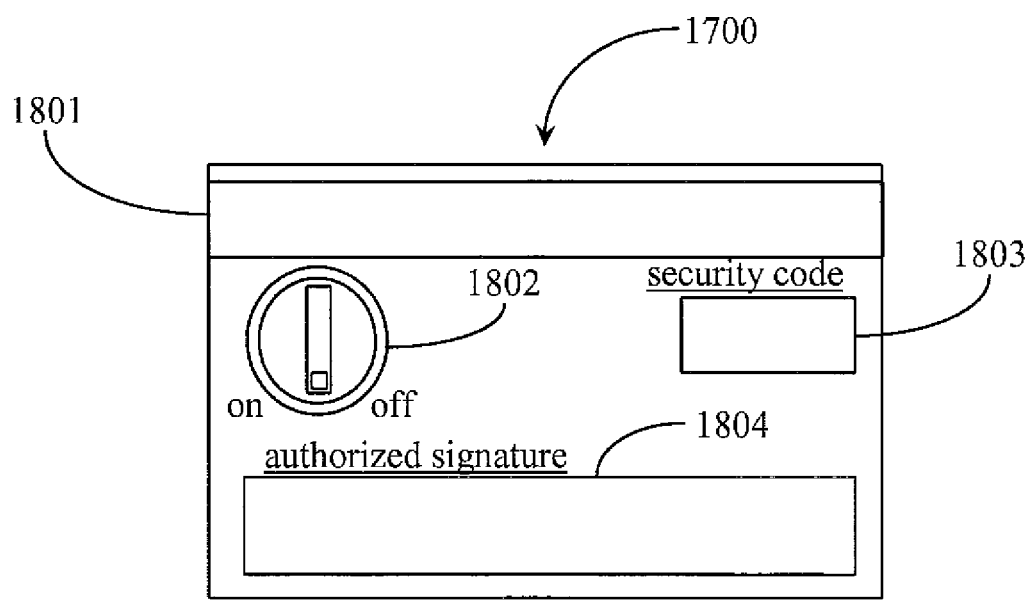
FIG. 18 is a rear view of the card of FIG. 17.

FIG. 17 is a front view of a radio frequency-enabled smart card 1700 according to an alternate embodiment of the present invention. FIG. 18 is a rear view of the card of FIG. 17. Referring now to FIG. 17, smart card 1700 has, in this embodiment, internal micro-circuitry such as an embedded smart chip 1701, an RFID chip 1702, and a biometric fingerprint sensor/scanner chip 1703. In one embodiment the entire front surface of smart card 1700 is an OLED touch screen 1705. In this regard it may provide all of the functionality of the touch screen on smart phone 100 including allowing the card owner to select from more than one card set loaded onto the internal card blank. Smart card 1700 has a power source 1704, which may be a rechargeable battery. All of the displays and screen windows previously described may run on touch screen 1705. In this example, card 1700 may be docked into the smart phone as previously described above.

Referring now to FIG. 18, the back surface of card 1700 still has a magnetic stripe 1801 in addition to the cards embedded RFID chip and smart chip. This configuration enables the card to function as a hybrid card capable of working in any retail sales transaction, regardless of the type of credit card reading terminal (contact or contactless). Smart card 1700 includes two OLED screens on the back surface. An OLED touch screen 1803 is adapted for displaying the three digit security code of a selected credit card. An OLED touch screen 1804 is adapted to display the user pre-scanned signature that is downloaded to the card during the multiplexing process described above.

Card 1700 has a power dial 1802 for turning the touch screens of the card on or off. In order to power the card, the user simply turns the card on via dial 1802. When the internal data card's power is off, the power dial is in the vertical position with the switch positioned at the bottom of its guide track. To turn the internal data card's OLED screen(s) on, the user rotates the power dial to an angle of 90° (ninety degrees) clockwise. Once the power dial is rotated 90°, the user slides the switch forward on the guide track to the on position. The power dial is designed to mitigate the potential of the user accidently powering the card on.

When the internal data card is activated, the OLED screens turn on. Before the user can access the data on the card they must first scan their fingerprint/thumbprint using the biometric fingerprint sensor/scanner of the smart card. Once the user's fingerprint/thumbprint is scanned and a match is confirmed, the user can then navigate the data stored within the internal data card, via OLED touch-screen 1705 located on the front of the internal data card. The user may select the credit card, check card, or ID card they would like to use so long as they have been pre-loaded into the system. Once the user has chosen the card, the internal data card displays a graphical image of that card media on the front OLED Touch screen 1705. On the back of the internal data card, the 3 digit security code of the card chosen is displayed on OLED touch screen 1803. Lastly, the user's stored signature may be displayed in OLED screen 1804.

It will be apparent to one with skill in the art that the digital wallet system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A hand-held electronic device for aggregation of and management of personal electronic data useable for identification and, or transacting business comprising:
   a non-transitory digital medium configured for storing data and software;
   a card reading/writing interface enabling capture of a plurality of existing transaction card data sets from each one of a magnetic strip of existing transaction cards, storing all of the transaction card data sets in the non-transitory digital medium;
   a display screen;
   a docking bay internal to the device configured for holding a card blank including a second magnetic strip, the docking bay including a writing interface configured for writing the transaction card data to the second magnetic strip; and
   a user interface application stored on and executable from the non-transitory digital medium;
   wherein all of the software and data storage is at the non-transitory digital medium with the exception of the second magnetic strip and the interface displays the plurality of transactional card data sets, at least one selected by a user of the device initiating a write of a transactional card data set associated with the at least one selected to the second magnetic strip; wherein the transactional card data set written to the second magnetic strip enables a wireless transaction while in the docking bay.

2. The electronic device of claim 1 wherein the hand-held electronic device is a smartphone enabled to communicate directly with an entities hosting the transactional cards enabling real-time display of at least a balance, credit line and interest rate for each data set displayed.

3. The electronic device of claim 1 wherein the display screen is an organic light emitting diode (OLED) touch screen.

4. The electronic device of claim 1 wherein the docking bay ejects the card blank enabling transactions at ATMs and terminals requiring physical interaction with the second magnetic strip.

5. The electronic device of claim 1 further including an image-scanning interface configured for scanning whole cards and associating an image rendered from the scanning with one of the transactional data sets and displaying both the image and the associated data set.

6. The electronic device of claim 1 wherein the existing transaction cards include any one of a credit card, debit card, store-issued card, and identification card.

7. The electronic device of claim 1 wherein the user interface displays on the entire touch screen interface.

8. The electronic device of claim 7 wherein the interface includes selectable options confirming identity, selecting and loading individual data sets enabling writing and rewriting over data sets on the second magnetic strip, ejecting the internal card blank, and navigating to account information hosted on a network, the account information associated with the individual personal data sets.

9. A readable and rewriteable magnetic card blank for use with a hand-held electronic device comprising:
a magnetic strip configured for accepting any one of a write and rewrite, via a write interface, of data sets collected by the hand-held electronic device from second magnetic strips of transactional cards read by a magnetic strip reading interface of the electronic device;
characterized in that the data sets are read into the electronic device via the card reading interface, displayed on a display screen enabling a user selection of one or more data sets which are selectively or collectively written as individual data sets onto the magnetic strip on the card blank via the card writing interface configured for use in electronic transacting or fulfillment of electronic identification queries; wherein the transactional card data set written to the second magnetic strip enables a wireless transaction while in a docking bay.

10. The magnetic card blank of claim 9 further comprising a microprocessor chip and an onboard battery power source.

11. The magnetic card blank of claim 10 further comprising a radio frequency identification (RFID) chip and a two-step power dial switch wherein the user rotates the power dial to an angle of 90 degree and slides the switch forward on a guide track to the "on" position.

12. The magnetic card blank of claim 11 further comprising a biometric sensor and scanner chip and one or more organic light emitting diode (OLED) touch screens.

13. The magnetic card blank of claim 12 wherein the OLED touch screens include one on the rear face of the card displaying a three digit security code, one on the rear face of the card displaying a signature, and one on the front face of the card displaying the front face of a credit, debit, or identification card having data stored on the magnetic media.

14. The magnetic card blank of claim 13 wherein the touch screen on the front of the card enables selection of an individual data set and card associated imagery enabling transactional use and displaying from a menu listing more than one data set and card associated imagery preloaded onto the card blank.

15. A method for collecting and redistributing one or more personal information data sets associated with electronic identification, credit, or debit transaction cards for use in electronic transacting or fulfillment of electronic identification queries comprising the steps:

(a) automatically entering or scanning data sets from magnetic strips of existing transaction cards into a hand-held electronic device via a magnetic strip reading interface;
(b) storing the transaction card data sets in a non-transitory digital storage medium of the electronic device;
(c) associating the each of the transaction card data sets with one or more credit, debit, or identification cards in a display of the electronic device
(d) selecting one or more of the displayed personal data sets from a touch screen display;
(e) entering security data confirming identity of a user and writing data via a writing interface;
(f) writing the one or more transaction card data sets selected in step d onto a second magnetic card strip of a card blank via a card writing interface in a docking bay holding the card blank within the electronic device; and
(g) utilizing the transactional card data set written to the second magnetic strip enabling a wireless transaction while in the docking bay.

16. The method of claim 15 wherein in the security data includes a personal identification number (PIN).

17. The method of claim 15 wherein in step (e) the security data entered includes a thumb or finger print scanned in to match a thumb or fingerprint image stored on the device.

18. The method of claim 15 wherein the data sets displayed in step (d) include real-time updated credit limit, interest and balance information gathered, by the electronic device over a communications network, from entities hosting the transactional cards.

19. The method of claim 15 further comprising the step of rendering the card blank inactive once ejected out of the hand-held electronic device after a specific amount of time at user election.

20. The method of claim 15 further comprising the step of OCR scanning both sides of an existing transaction card creating the identical look of the card once ejected out of the hand-held electronic device.

21. The method of claim 15 further comprising the step of using the OCR image scanner in the device scanning in text or graphic images of the transaction cards, associating the images with their data sets.

22. The method of claim 15 further comprising the step of transferring wireless contact free card transactions of sales record and receipt to the smart phone device and storing the wireless contact free card transactions of sales record and receipt into an associated card folder via any viable RF or wireless protocol.

23. The method of claim 22 further comprising the step of locating and connecting user to GPS sensed store wireless or RF signal protocol proximate transactions and accepting a digital receipt and storing the digital receipt in the associated folders.

24. The method of claim 15 wherein the electronic device is a smart phone and further comprising the steps of scanning, reading or swiping and uploading discount incentive coupons at the reading interface as transaction cards into the smart phone device and setting user reminders displaying or emailing alerting user on a selected pre-expiration time or alerting user when discount incentive coupons are in a preset GPS proximity to a retail issuer of the discount incentive coupons.

25. The method of claim 15 further comprising the steps of only partially ejecting the data card by touch screen initiation physically exposing the transaction card magnetic strip configured for use in a retail POS transaction while keeping the card partially in the docking bay of the electronic device docking station.

26. The method of claim 15 further comprising the steps of inserting and ejecting read/write the transaction card into and out of the electronic device, respectively, enabling transfer of the data set on the magnetic strip while engaging a guide track and slidable switch of the electronic device, causing the reading of the data set; wherein transferred card information is subsequently written to the second magnetic strip.

27. The method of claim 15 further comprising the step of providing the electronic device with a biometric scan screen with virtual biometric scanning pad and alternate scan button configured for fingerprint or thumbprint scan authentication by comparison with a previous scan or photo and subsequent authentication.

28. The method of claim 27 further comprising the step of providing a user selectable time interval enabling biometric re-authentication during a transaction session insuring transaction is underway with the authenticated user.

29. The method of claim 15 further comprising the step of providing a safety function purging data written to the internal card blank automatically after a user selected time interval.

30. The method of claim 15 further comprising the step of scanning and storing on the electronic device of authenticated user biometric scanned samples enabling comparison to a plurality of authorized users.

31. The method of claim 15 further comprising the step of using a dual-interface chip managing both biometric scanning support and wireless communication transactions simultaneously in the electronic device.

\* \* \* \* \*